(12) United States Patent
Kain et al.

(10) Patent No.: US 12,367,195 B1
(45) Date of Patent: Jul. 22, 2025

(54) QUERY RECORD ESTIMATOR

(71) Applicant: Visa International Service Association, San Francisco, CA (US)

(72) Inventors: Vishesh Kain, Delhi (IN); Jayakrishna Katru, Bengaluru (IN)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/745,820

(22) Filed: Jun. 17, 2024

(51) Int. Cl.
  *G06F 16/00* (2019.01)
  *G06F 16/2455* (2019.01)
  *G06F 16/28* (2019.01)

(52) U.S. Cl.
  CPC ...... *G06F 16/24554* (2019.01); *G06F 16/283* (2019.01); *G06F 16/285* (2019.01)

(58) Field of Classification Search
  CPC . G06F 16/24554; G06F 16/285; G06F 16/283
  See application file for complete search history.

(56) References Cited

U.S. PATENT DOCUMENTS

2019/0220464 A1* 7/2019 Butani ............... G06F 16/248

* cited by examiner

*Primary Examiner* — Yicun Wu
(74) *Attorney, Agent, or Firm* — K&L Gates LLP

(57) ABSTRACT

A method and system for efficiently executing query requests based on an estimated number of query records returned. A database server may set a predetermined record count associated with an estimated number of query records. The predetermined record count prevents a single query or multiple queries from intentionally or unintentionally consuming an excessive amount of computational resources. If the estimated number of query records exceed the predetermined record count the database server may cancel or prevent the execution of the query request in order to prevent one or more query requests from consuming an excessive amount of computing resources.

20 Claims, 11 Drawing Sheets

| Query Request | database Estimation | Est Rec Min Count | Est Rec Max Count | Actual Count | Date |
|---|---|---|---|---|---|
| select count (*) from (select column1, column2, sum (column3) from table where month ='2023-03' and lower (column4) in ('column4_value2') group by column1, column2)q; | 1166194172 | 17 | 43 | 24 | 10/24/2023 |
| select count (*) from (select column1, column3, column4, column5, sum(column10) from table where month = '2023-02' and column6 = 'column6_value5' and lower(column4) in ('column4_value2') group by select column1, column3, column4, column5) q; | 144339853 | 2197 | 10266 | 7000 | 11/15/2023 |
| select count (*) from (select column9, column3, column4, column5, sum(column10) from table where month = '2023-02' and column6 in ('column6_value5', 'column6_value6') group by column9, column3, column4, column5) q; | 401445216 | 11830 | 899322 | 14176 | 2/12/2023 |

FIG. 3

```
302 ─── "source_type": {
            "5tb": {
                "202207": 2,
                "202208": 2,      ─── 306
                "202209": 2
            },
            "reval":{
                 ┌ "202207": 54,
            308 ─┤ "202208": 54,
                 └ "202209": 57
            },
304 ─── "miscb2":{
            "202207": 2,
            "202208": 2,
            "202209": 6
        },
        "ormb_ci":{
            "202207": 505406935,
            "202208": 516555984,
            "202209": 505491127
        },
        "visa intercompany":{
            "202207": 12,
            "202208": 12,
            "202209": 54
```

"Indtry_seg,issr_client_typ": {
            "indtry_seg": 13.75,           ⎤─504
            "issr_client_typ": 13.75       ⎦
        },
502─╲  "gl_clstr,issr_client_typ":{ ─512
            "gl_clstr": 8.238805970149254, ─506
            "issr_client_typ": 34.5─╲508
        },
        "gl_sub_geo,bill_line_desc":{
            "gl_sub_geo": 487.6388888888889,
            "bill_line_desc": 3.032475384349629
        },
        "gl_sub_geo,acqr_sub_geo":{
            "gl_sub_geo": 25.0,
            "acqr_sub_geo": 28.125
        },
        "gl_sub_geo,incentive_client_type":{
            "gl_sub_geo": 4.944444444444445,
            "incentive_client_type": 12.714285714285714
        },
        "gl_ctry,bill_line_desc":{
            "gl_ctry": 243.4917355371901,
            "bill_line_desc": 10.178787355329073
        },
        "gl_regn,vd_code":{
            "gl_regn": 4.0,
            "vd_code": 4.0
```

FIG. 6

QUERY RECORD ESTIMATOR

TECHNICAL FIELD

A method and system for efficiently executing query requests based on an estimated number of query records returned.

SUMMARY

In one aspect, the present disclosure provides a method for processing a plurality of search queries, the method comprising: receiving, by a server, a search query comprising search parameters to retrieve data from a multi-dimensional database; receiving, by the server, a first computed data source, a second computed data source, and a third computed data source, wherein: the first computed data source comprises historical data associated with previously executed search queries on the multi-dimensional database and actual record counts returned by the previously executed search queries, the second computed data source comprises a total count of distinct values for each of a plurality of groupings segmented by predetermined categories within the multi-dimensional database, and the third computed data source comprises a correlation of the total count of distinct values between at least two of the plurality of groupings; computing, by the server, an estimated record count for the search query on the multi-dimensional database based on a comparison between the search query and the previously executed search queries of the first computed data source and an estimation equation comprising data values from the second computed data source and the third computed data source; and executing, by the server, the search query based on the estimated record count not exceeding a predetermined record count.

In another aspect, the present disclosure provides a method for processing a plurality of search queries, the method comprising: receiving, by a server, a search query comprising search parameters to retrieve data from a multi-dimensional database; generating, by the server, a first computed data source, a second computed data source, and a third computed data source, wherein: the first computed data source comprises historical data associated with previously executed search queries on the multi-dimensional database and actual record counts returned by the previously executed search queries, the second computed data source comprises a total count of distinct values for each of a plurality of groupings segmented by predetermined categories within the multi-dimensional database, and the third computed data source comprises a correlation of the total count of distinct values between at least two of the plurality of groupings; computing, by the server, an estimated record count for the search query on the multi-dimensional database based on a comparison between the search query and the previously executed search queries of the first computed data source and an estimation equation comprising data values from the second computed data source and the third computed data source; and executing, by the server, the search query based on the estimated record count not exceeding a predetermined record count.

In yet another aspect, the present disclosure provides a method for processing a plurality of search queries, the method comprising: receiving, by a server, a search query comprising search parameters to retrieve data from a multi-dimensional database; receiving, by the server, a first computed data source, a second computed data source, and a third computed data source, wherein: the first computed data source comprises historical data associated with previously executed search queries on the multi-dimensional database and actual record counts returned by the previously executed search queries, the second computed data source comprises a total count of distinct values for each of a plurality of groupings segmented by predetermined categories within the multi-dimensional database, and the third computed data source comprises a correlation of the total count of distinct values between at least two of the plurality of groupings; comparing, by the server, the search query and the previously executed search queries of the first computed data source to determine whether the search query matches one of the previously executed search queries; computing, by the server, an estimated record count for the search query on the multi-dimensional database based on a comparison between the search query and the previously executed search queries of the first computed data source and an estimation equation comprising data values from the second computed data source and the third computed data source; and one of: executing, by the server, the search query based on the estimated record count not exceeding a predetermined record count; or cancelling, by the server, the search query based on the estimated record count exceeding the predetermined record count. The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

BRIEF DESCRIPTION OF THE DRAWINGS

In the description, for purposes of explanation and not limitation, specific details are set forth, such as particular aspects, procedures, techniques, etc. to provide a thorough understanding of the present technology. However, it will be apparent to one skilled in the art that the present technology may be practiced in other aspects that depart from these specific details.

The accompanying drawings, where like reference numerals refer to identical or functionally similar elements throughout the separate views, together with the detailed description below, are incorporated in and form part of the specification, and serve to further illustrate aspects of concepts that include the claimed disclosure and explain various principles and advantages of those aspects.

Figure 1:
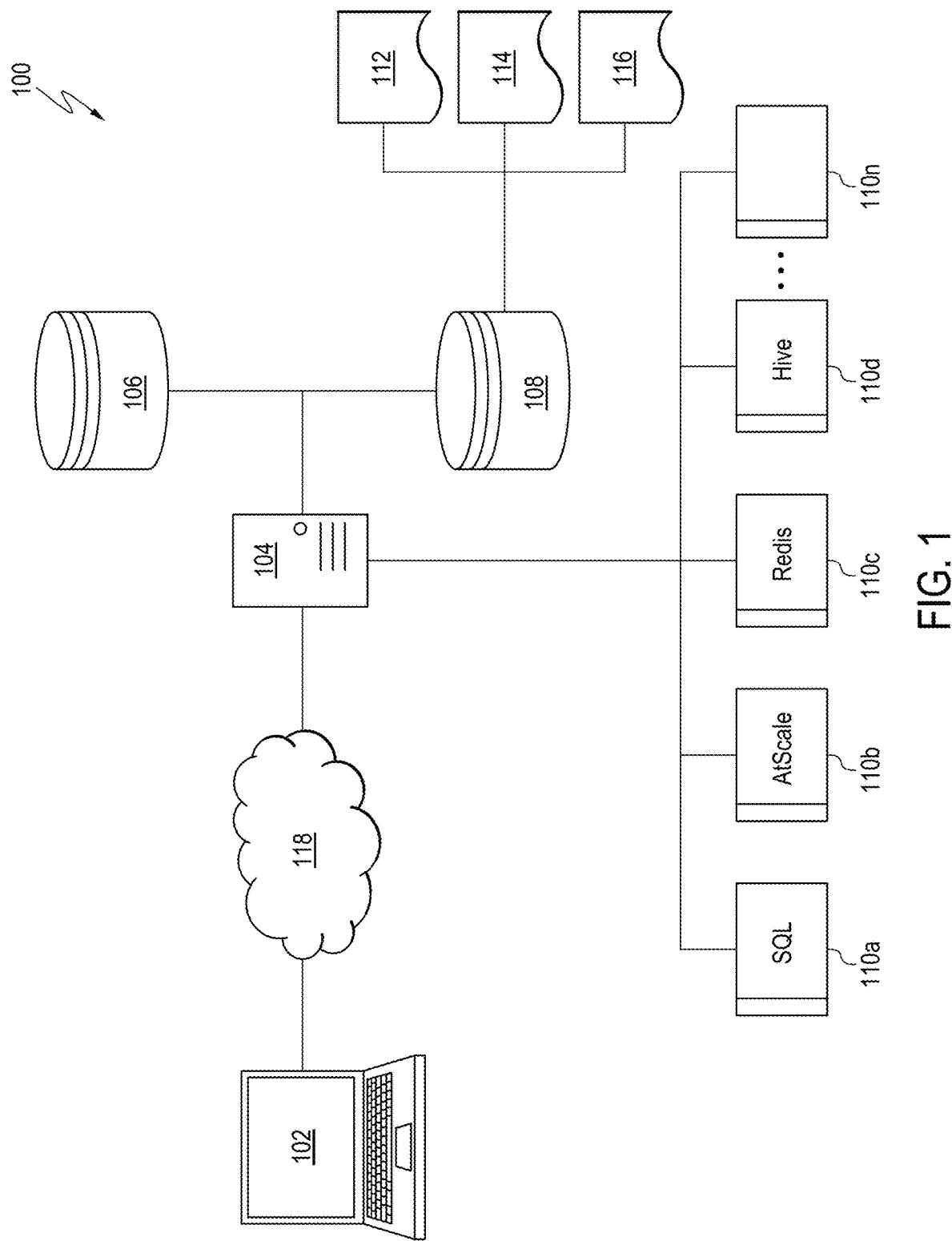

The systems and methods disclosed herein have been represented where appropriate by conventional symbols in the drawings, showing only those specific details that are pertinent to understanding the various aspects of the present disclosure so as not to obscure the disclosure with details that will be readily apparent to those of ordinary skill in the art having the benefit of the description herein.

FIG. 1 shows a block diagram of the network architecture, according to at least one aspect of the present disclosure.

Figure 2:
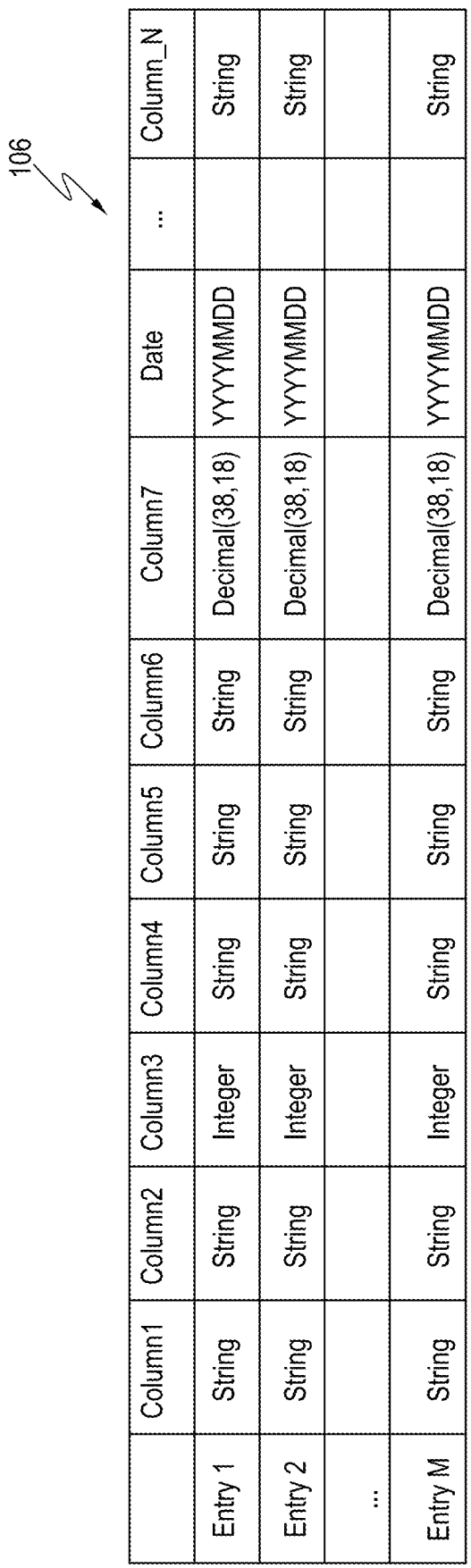

FIG. 2 shows an example of a multi-dimensional database and the associated data type for each column, according to at least one aspect of the present disclosure.

FIG. 3 shows a first data source, according to at least one aspect of the present disclosure.

Figure 5:
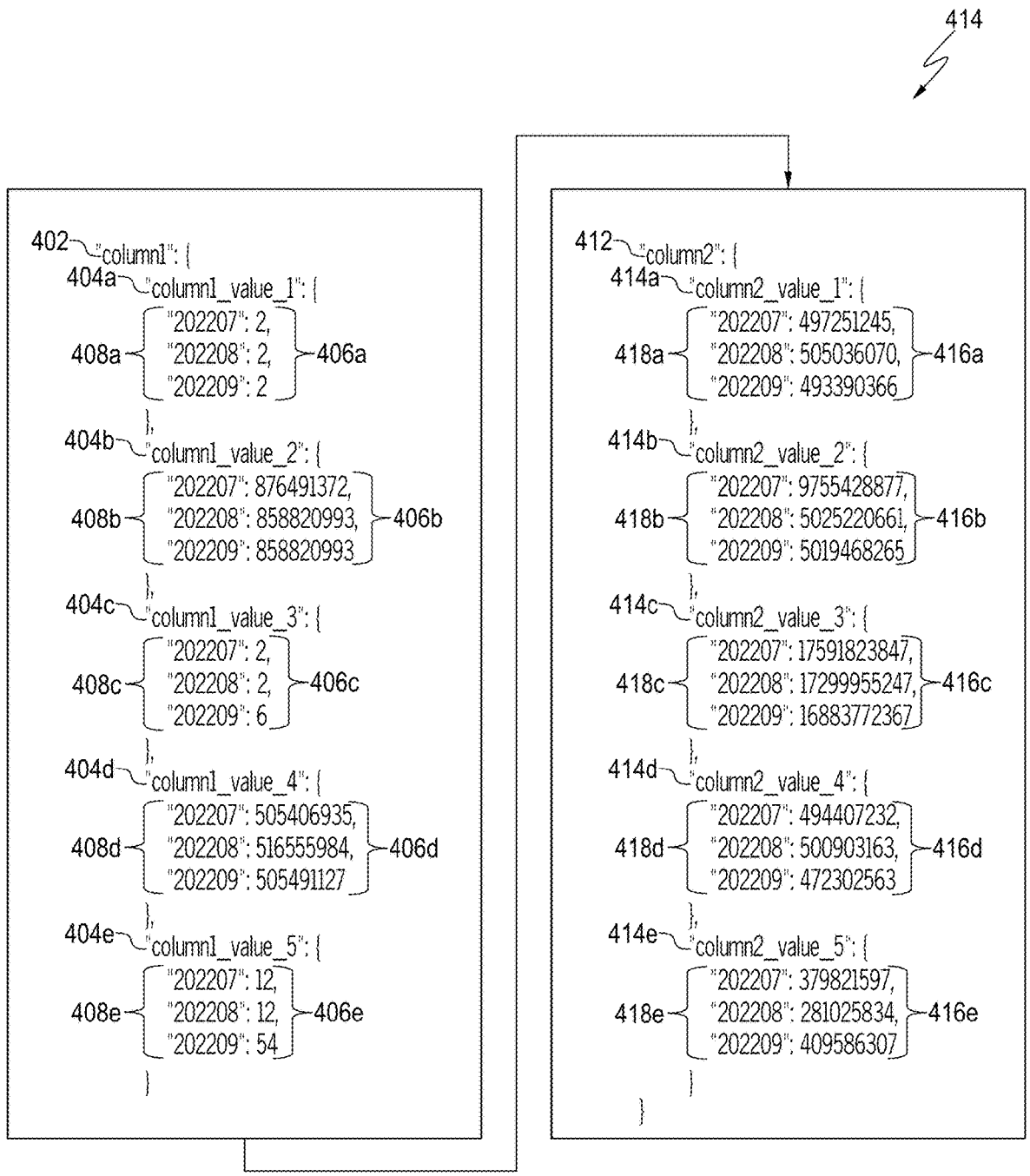

FIGS. 4 and 5 show examples of a second data source, according to at least one aspect of the present disclosure.

Figure 7:
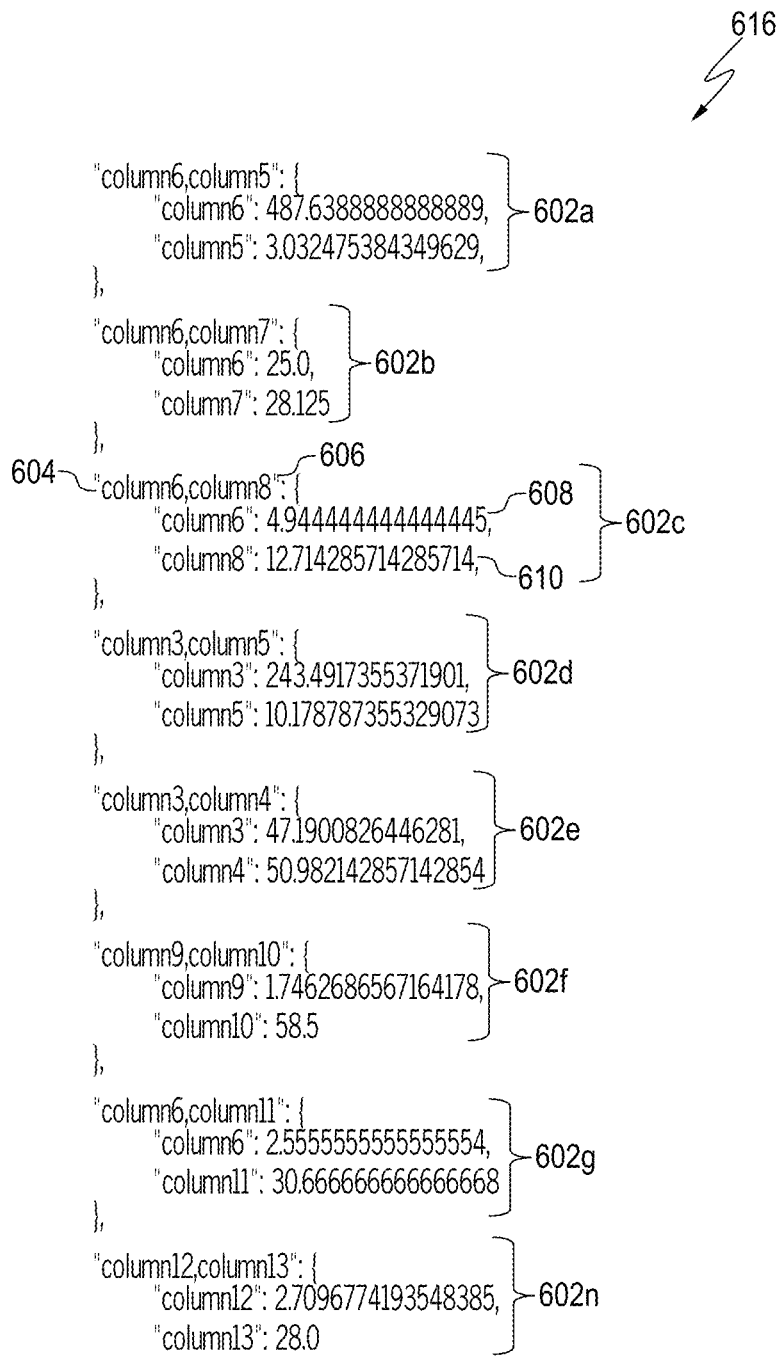

FIGS. 6 and 7 show examples of a third data source, according to at least one aspect of the present disclosure.

Figure 8:
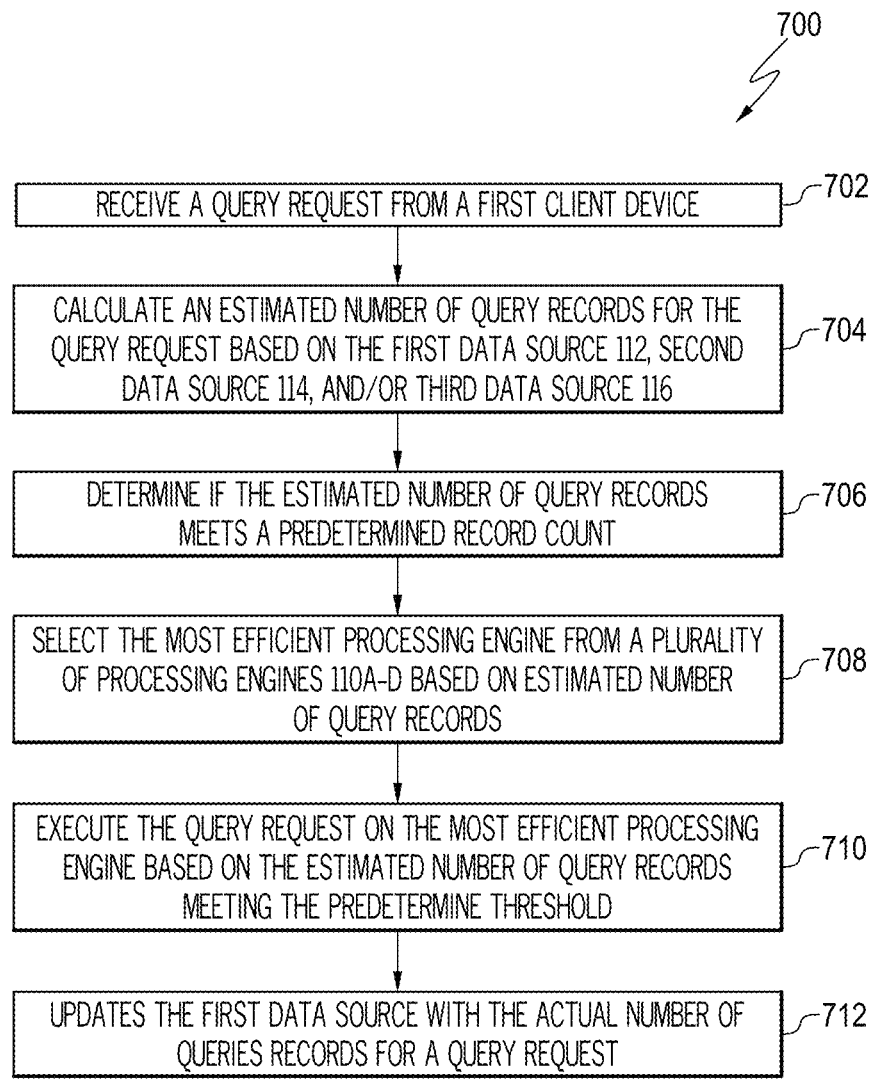

FIG. 8 shows a logic flow diagram for estimating a number of query records prior to executing a query request, according to at least one aspect of the present disclosure.

Figure 9:
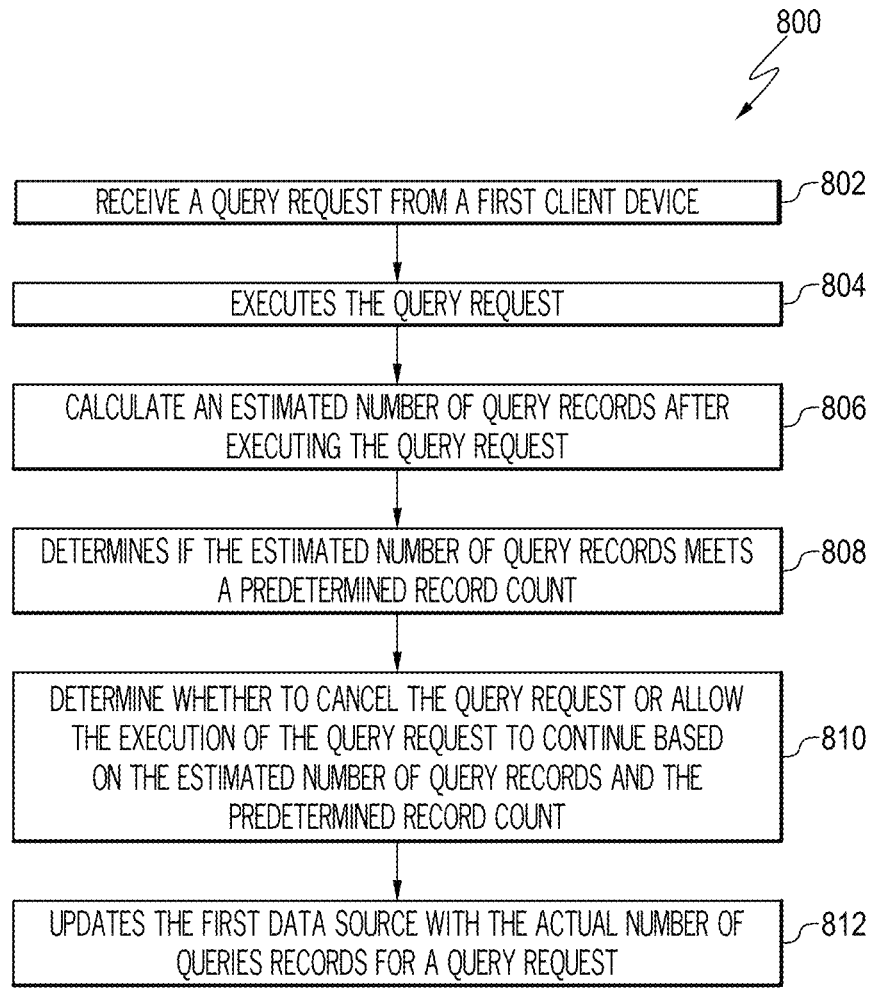

FIG. 9 shows a logic flow diagram for estimating a number of query records contemporaneous to executing a query request, according to at least one aspect of the present disclosure.

Figure 10:
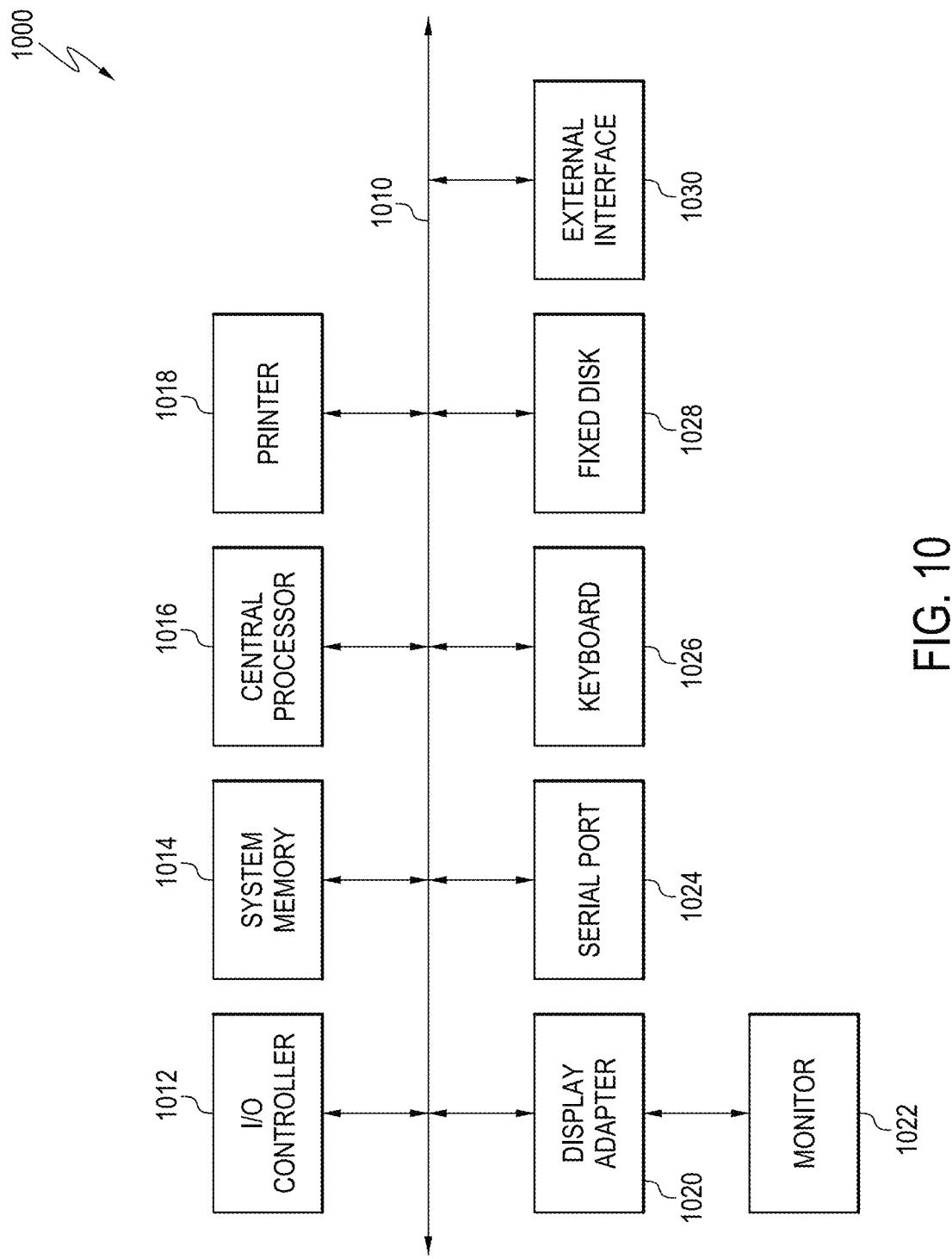

FIG. 10 is a block diagram of a computer apparatus with data processing subsystems or components, according to at least one aspect of the present disclosure.

Figure 11:
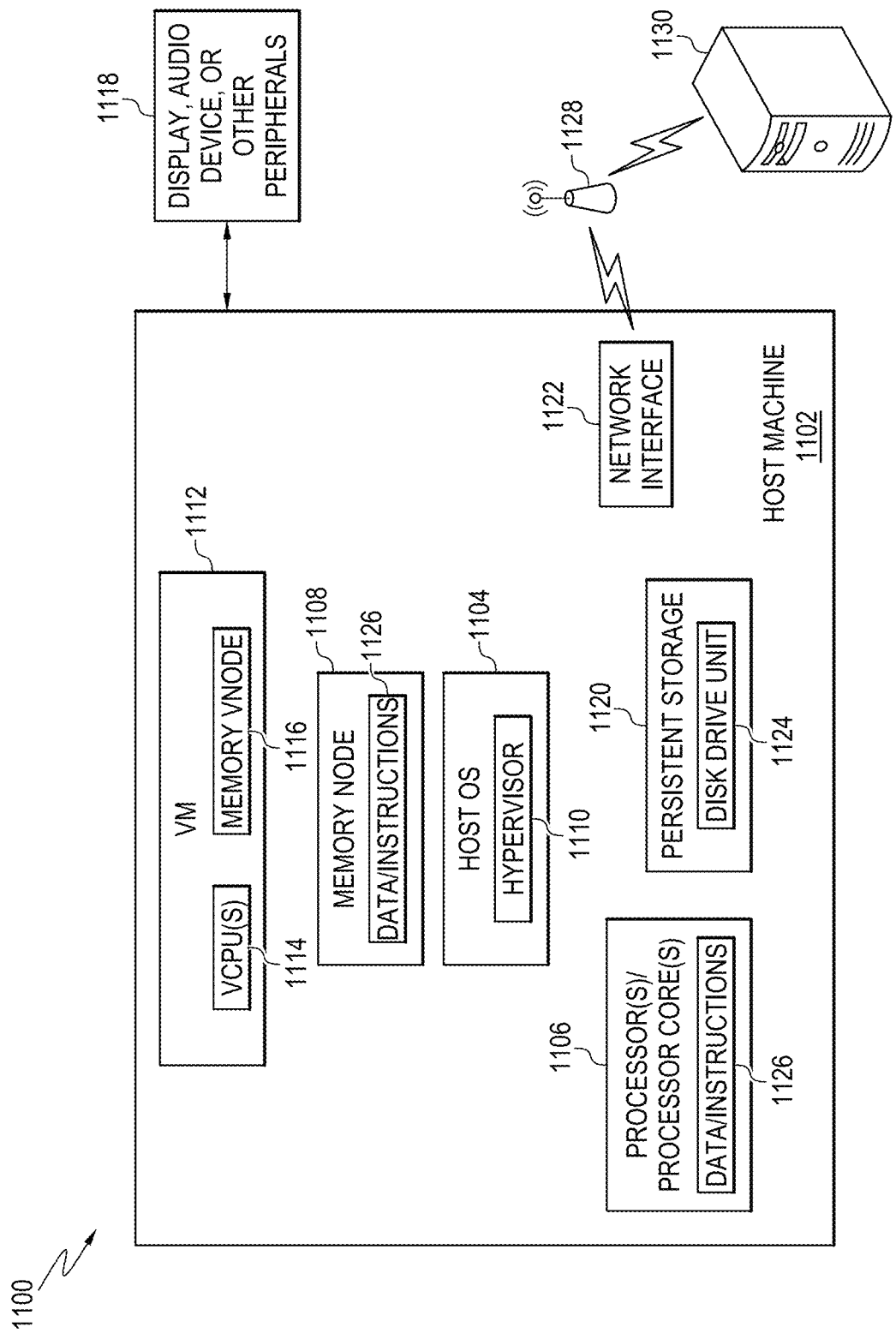

FIG. 11 is a diagrammatic representation of an example system that includes a host machine within which a set of instructions to perform any one or more of the methodologies discussed herein may be executed, according to at least one aspect of the present disclosure.

DESCRIPTION

The following disclosure may provide example systems, devices, and methods for conducting a financial transaction and related activities. Although reference may be made to such financial transactions in the examples provided below, aspects are not so limited. That is, the systems, methods, and apparatuses may be utilized for any suitable purpose.

Before discussing specific embodiments, aspects, or examples, some descriptions of terms used herein are provided below.

The terms "client device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a cellular phone, a network-enabled appliance, and/or any other device, system, and/or software application configured to communicate with a remote device or system.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

The terms "server," or "server computer" may typically be a powerful computer or cluster of computers. For example, the server computer can be a large mainframe, a minicomputer cluster, or a group of servers functioning as a unit. The server computer may be associated with an entity such as a processing network or a cloud network. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments or aspects, the server computer may provide and/or support network cloud service.

The present disclosure describes a method and system for executing query requests based on an estimated number of query records returned to a requesting client. A database server may become inundated with query requests and may set a predetermined record count associated with an estimated number of query records. After the database server receives a query request, it estimates the number of records that the query will return, prior to or contemporaneously to the execution of the query. If the number of estimated records, associated with the query request exceeds the predetermined record count, the database server will not execute or cancel the query request. The predetermined record count prevents a single query or multiple queries from intentionally or unintentionally consuming an excess amount of computational resources. The predetermined record count may be a predetermined fixed number of records or may be dynamically determined by the database server based on present query requests and an aggregate of the estimated number of records. In one example, the database server may scale the predetermined record count down based on an increased number of requests. In another example, the present disclosure can prevent a denial of server attack on a database server from a plurality of malicious query requests. In various aspects of the present disclosure, Table 1 shows various examples of the computation resources that would be consumed based on a multidimensional databased that had 23 billion records associated with each month processed by a cluster computing system comprising 5000 processing cores. The table shows various scenarios for processing multiple queries at the same time on a cluster and their ability to lower the query processing performance of the system. In certain cases, this performance can cause denial of service if many bad queries (e.g., more than 1 million records) are executed on the system and use up all the system resources.

| Input Records hit by query | Serial Mode Execution | Parallel Mode Execution | Tasks Executed |
|---|---|---|---|
| 677,235,844 | 4 mins | 5 mins | 25650 |
| 358,325,853,273 | 6 mins | 11 mins | 36213 |
| 18,251,265,260 | 7 mins | 19 mins | 36212 |
| 358,325,853,273 | 15 mins | 35 mins | 37029 |

Note, "tasks executed" in the table above describes the tasks processed on each CPU core parallelly; sequential mode execution is defined as processing one query request at a time operating on a cluster; and parallel mode execution is defined as several queries operating on a cluster concurrently.

In one aspect, the database server conserves processing resources by calculating the estimated number of query records contemporaneous to the execution of the query request. Therefore, the database server present processing resources from being expended on bad queries without impacting the quality of service for the client, associated with processing delays.

FIG. 1 shows a block diagram of the network architecture 100, according to at least one aspect of the present disclosure. The network comprises a database server 104 in communication with a client device 102 over a communication network 118. The database server 104 is configured to receive query requests from the client device 102 and execute the query requests on a multi-dimensional database 106. Additionally, the database server is configured to execute or receive statistical analysis of the multi-dimensional database 106 from a statistical analysis database 108. The statistical analysis database 108 may comprise a first data source 112 associated with previously executed query requests, a second data source 114 associated with distinct values of the multi-dimensional database 106, and a third data source 116 associated with the ratios between groupings of the distinct values. Additionally, the database server 104 may select from a plurality of query processing engines or database systems 110a-n (e.g., SQL, AtScale, Redis, Hive, etc.) for execution of the query request. The selection of the query processing engine may be based on the query request and/or the estimated number of records.

FIG. 2 shows an example of a multi-dimensional database 106 and the associated data type for each column, according to at least one aspect of the present disclosure. The multi-dimensional database 106 comprises M number of rows and N number of columns (e.g., source type), where each of the columns are associated with a data type. For example, the data type for column7 is a decimal value with a precision of 38 allowing up to 38 digits with 18 digits being to the right of the decimal point. The database server 104 evaluates the number of the distinct values for column7 based on their decimal values. The database server 104 further categorizes the occurrence of the distinct values based on a classification value, such as the month for the entry in the column.

FIG. 3 shows a first data source 112, according to at least one aspect of the present disclosure. Prior to calculating an estimate number of query records, the database server 104 receives an updated set of data sources 112-116 from the statistical analysis database 108, for the current version of the multi-dimensional database 106. The first data source 112 is updated after each completed query with the query request 202, the database estimation 204, a minimum number of estimated query records 206, maximum number of estimated query records 208, the actual number of query records 210, and the query date 212 when the query request was executed. In one example, the database server 104 periodically purges the entries (i.e., the row associated with the query request) in the first data source 112 based on the previously executed query date 212 exceeding a time-to-live (TTL) interval with the current date. The database server 104 may automatically determine a TTL interval based on the frequency that the database 106 is updated, the number of records added by each update to the database 106, and/or the total number of records in the database 106.

FIGS. 4 and 5 show examples of a second data source 114, according to at least one aspect of the present disclosure. A new version of the second data source 114 may be generated after each update to the multi-dimensional database 106. FIG. 4 shows a second data source 314 comprising a total record count 306 for all the distinct values 304 for each grouping 302 (e.g., "source_type", column). The total record count 306 may be subdivided and calculated for specific months to more accurately estimate an average record count across the year. The second data source 314 may be generated by the database server 104 or a dedicated computing resource for distinct values for a grouping 302 (e.g., source_type, column1) and segmented by a granular category or parameter 308 (e.g., month). The values of the second data source 114 may be determined by the following query: select 'column1', lower (column1),cpd_mnth,count(*) from table where cpd_mnth in ('2023-01','2023-02','2023-03') group by lower(col), cpd_mnth. The second data source 314 shows five distinct string values for the grouping 302 (e.g., "source_type", column). FIG. 5 shows another example of a second data source 414 comprising a first column 402 and a second column 412. For simplicity of the example, the first column 402 comprises 5 distinct values 404a-e and the second column comprise 5 distinct values 414a-e. Each of the distinct values 404a-e in the first column and the second column are segmented in a month grouping 408a-e and 418a-e. In this example, the distinct values are only present in July, august, and September of 2022. For each month, a total record count 406a-e and 416a-e is calculated based on their occurrence in the database.

FIGS. 6 and 7 show examples of a third data source 116, according to at least one aspect of the present disclosure. A new version of the third data source 116 may be generated after each update to the multi-dimensional database 106 in conjunction with the second data source 114. In one example, the third data source 116 quantifies the relationship between each column and to calculate the distinct records for aggregated values. FIG. 6 shows a third data source 516 comprising a plurality of computed ratio values 504 based on the relationship between the distinct values of a first grouping 502 (e.g., gl_clstr) and a second grouping 512 (e.g., issr_client_typ), for all the possible combination (e.g., if there are N columns, there are 2*[(N−1)!] computed ratio values between any two columns). A first value of the plurality of computed ratio values 504 comprises a first ratio value 506 relative to the first grouping 502 and a second ratio value 508 relative to the second grouping 512.

FIG. 7 shows another example of a third data source 616 comprising a plurality of computed rations 602a-n based on the relationship between the distinct values. In this example, the third ration 602c comprises a ratio calculation for a first column 604 (e.g., column6) and a second column 606 (e.g., column8), for all the possible combination. A first value of the plurality of computed rations 602a-n comprises a first ratio value 608 relative to the first column 604 and a second ratio value 610 relative to the second column 606. The first ratio value 608 for the third rations 602c is calculated based on the following query:

select 'column6, 'column8' as col_name, count(distinct lower(column6)), count(distinct lower(column8)), count(distinct lower(column6), lower(column8)), month from table where month in ('2023-01','2023-02','2023-03') group by month.

The second ratio value 610 for the third rations 602c is calculated based on the following query:

select 'column8, 'column6' as col_name, count(distinct lower(column8)), count(distinct lower(column6)), count(distinct lower(column8), lower(column6)), month from table where month in ('2023-01','2023-02','2023-03') group by month.

These queries calculate ratio values for specific months (e.g., 2023001, 202302, 202303). Additionally, the database server 104 can aggregate the data across all months or add and remove specific months based on the query request.

In one example, the database server 104 receives a query request from the client device 102. The query request is "Select column3, column4, column5, sum(column10) from table where month='202209' and column1='column1_value4' group by column3, column4, column5." The database server 104 uses the second data source to verify the total number of all the values that are applied in the filter and/or where condition. The database server 104 determines that column1='column1_value4' has a total record count of around 500 million records. Next, the database server 104 determines from the second data source 114 the total distinct values for all the columns, column3, column4, column5, as {'column3': 247, 'column4': 227, 'column5': 5789}. Next the database server 104 determines from third data source the following ratios:

column3, column5—{"column3": 243.4917355371901, "column5": 10.178787355329073} column4, column5—{"column4": 27.022321428571427, "column5": 1.045603731214372} column3, column4—{"column3": 47.1900826446281, "column4": 50.982142857142854}

The database server 104 populates an estimation equation based on the query request and calculates 5789*10.17+ 5789*1.04+247*47.19=76635, as the number of estimated records based on columns, with a total average record count for each month at around 23 billion records. The filter record estimation based on the filters for column1='column1_value4', is around 500 million, and is 2.18 percent of total records. Finally, the database server 104 estimates the total max record count by, 76635*2.18)/ 100=1676. In this example, the actual records count was 1024. The estimation equation and the specific data values from the second data source 114 and the third data source 116 may be different for each query request.

FIG. 8 shows a logic flow diagram 700 for estimating a number of query records prior to executing a query request, according to at least one aspect of the present disclosure. The database server 104 receives 702 a query request from a first client device 102. The database server 104 calculates 707 an estimated number of query records prior to executing the query request. In order to calculate the estimated number of query records, the database server 104 first determines if the query request was previously received by evaluating the first data source 112 and determines the estimated number of query records 210 based on the previously returned results. If the query request 202 is not present in the first data source 112, the database server 104 calculates the estimated number of query records with the estimation equation based on the query request, the second data source 114, and the third data sources 116. The database server 104 determines 706 if the estimated number of query records meets a predetermined record count. If the estimated number of records is within the predetermined record count, the database server 104 selects 708 the most efficient processing engine from a plurality of processing engines 110a-d based on estimated number of query records. The database server 104 executes 710 the query request on the most efficient processing engine based on the estimated number of query records meeting the predetermine threshold. Finally, the database server 104 updates 712 the first data source 112 with the actual number of queries records 210 for a query request.

FIG. 9 shows a logic flow diagram 800 for estimating a number of query records contemporaneous to executing a query request, according to at least one aspect of the present disclosure. The database server 104 receives 802 a query request from a first client device 102. The database server 104 executes 804 a query request. Contemporaneous to the execution of the query request, the database server 104 calculates 806 an estimated number of query records. In order to calculate the estimated number of query records, the database server 104 first determines if the query request was previously received by evaluating the first data source 112 and determines the estimated number of query records 210 based on the previously returned results. If the query request 202 is not present in the first data source 112, the database server 104 calculates the estimated number of query records based on the second data source 114 and the third data sources 116. The database server 104 determines 808 if the estimated number of query records meets a predetermined record count. The database server 104 determines 810 whether to cancel the query request or allow the execution of the query request to continue based on the estimated number of query records and the predetermined record count. If the estimated number of query records exceeds the predetermined record count, the database server 104 cancels the query request. However, if the estimated number of query records is below the predetermined record count, the database server 104 allows the query request to continue processing. Finally, the database server 104 updates 812 the first data source 112 with the actual number of queries records 210 for a query request.

FIG. 10 is a block diagram of a computer apparatus 1000 with data processing subsystems or components, according to at least one aspect of the present disclosure. The subsystems shown in FIG. 10 are interconnected via a system bus 1010. Additional subsystems such as a printer 1018, keyboard 1026, fixed disk 1028 (or other memory comprising computer readable media), monitor 1022, which is coupled to a display adapter 1020, and others are shown. Peripherals and input/output (I/O) devices, which couple to an I/O controller 1012 (which can be a processor or other suitable controller), can be connected to the computer system by any number of means known in the art, such as a serial port 1024. For example, the serial port 1024 or external interface 1030 can be used to connect the computer apparatus to a wide area network such as the Internet, a mouse input device, or a scanner. The interconnection via system bus allows the central processor 1016 to communicate with each subsystem and to control the execution of instructions from system memory 1014 or the fixed disk 1028, as well as the exchange of information between subsystems. The system memory 1014 and/or the fixed disk 1028 may embody a computer readable medium.

FIG. 11 is a diagrammatic representation of an example system 1100 that includes a host machine 1102 within which a set of instructions to perform any one or more of the methodologies discussed herein may be executed, according to at least one aspect of the present disclosure. In various aspects, the host machine 1102 operates as a standalone device or may be connected (e.g., networked) to other machines. In a networked deployment, the host machine 1102 may operate in the capacity of a server or a client machine in a server-client network environment, or as a peer machine in a peer-to-peer (or distributed) network environment. The host machine 1102 may be a computer or computing device, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example system 1100 includes the host machine 1102, running a host operating system (OS) 1104 on a processor or multiple processor(s)/processor core(s) 1106 (e.g., a central processing unit (CPU), a graphics processing unit (GPU), or both), and various memory nodes 1108. The host OS 1104 may include a hypervisor 1110 which is able to control the functions and/or communicate with a virtual machine ("VM") 1112 running on machine readable media. The VM 1112 also may include a virtual CPU or vCPU 1114. The memory nodes 1108 may be linked or pinned to virtual memory nodes or vNodes 1116. When the memory node 1108 is linked or pinned to a corresponding vNode 1116, then data may be mapped directly from the memory nodes 1108 to their corresponding vNodes 1116.

All the various components shown in host machine 1102 may be connected with and to each other or communicate to each other via a bus (not shown) or via other coupling or communication channels or mechanisms. The host machine 1102 may further include a video display, audio device or other peripherals 1118 (e.g., a liquid crystal display (LCD), alpha-numeric input device(s) including, e.g., a keyboard, a cursor control device, e.g., a mouse, a voice recognition or biometric verification unit, an external drive, a signal generation device, e.g., a speaker,) a persistent storage device 1120 (also referred to as disk drive unit), and a network interface device 1122. The host machine 1102 may further include a data encryption module (not shown) to encrypt data. The components provided in the host machine 1102 are those typically found in computer systems that may be suitable for use with aspects of the present disclosure and are intended to represent a broad category of such computer components that are known in the art. Thus, the system 1100 can be a server, minicomputer, mainframe computer, or any other computer system. The computer may also include different bus configurations, networked platforms, multi-processor platforms, and the like. Various operating systems may be used including UNIX, LINUX, WINDOWS, QNX ANDROID, IOS, CHROME, TIZEN, and other suitable operating systems.

The disk drive unit 1124 also may be a Solid-state Drive (SSD), a hard disk drive (HDD) or other includes a computer or machine-readable medium on which is stored one or more sets of instructions and data structures (e.g., data/instructions 1126) embodying or utilizing any one or more of the methodologies or functions described herein. The data/instructions 1126 also may reside, completely or at least partially, within the main memory node 1108 and/or within the processor(s) 1106 during execution thereof by the host machine 1102. The data/instructions 1126 may further be transmitted or received over a network 1128 via the network interface device 1122 utilizing any one of several well-known transfer protocols (e.g., Hyper Text Transfer Protocol (HTTP)).

The processor(s) 1106 and memory nodes 1108 also may comprise machine-readable media. The term "computer-readable medium" or "machine-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the host machine 1102 and that causes the host machine 1102 to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example aspects described herein may be implemented in an operating environment comprising software installed on a computer, in hardware, or in a combination of software and hardware.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the various aspects of the disclosure as described herein.

The computer program instructions also may be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 1130 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the host machine 1102, with each server in the network 1130 (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Examples of the method disclosed herein, according to various aspects of the present disclosure, are provided below in the following embodiments. An aspect of the method may include any one or more than one of, and any combination of, the embodiments described below.

In a first embodiment, the present disclosure provides method for processing a plurality of search queries, the method includes receiving, by a server, a search query comprising search parameters to retrieve data from a multi-dimensional database; receiving, by the server, a first computed data source, a second computed data source, and a third computed data source. The first computed data source comprises historical data associated with previously executed search queries on the multi-dimensional database and actual record counts returned by the previously executed search queries, the second computed data source comprises a total count of distinct values for each of a plurality of groupings segmented by predetermined categories within the multi-dimensional database, and the third computed data source includes a correlation of the total count of distinct values between at least two of the plurality of groupings The method further includes computing, by the server, an estimated record count for the search query on the multi-dimensional database based on a comparison between the search query and the previously executed search queries of the first computed data source and an estimation equation comprising data values from the second computed data source and the third computed data source; and executing, by the server, the search query based on the estimated record count not exceeding a predetermined record count.

Additionally, the first embodiment further includes determining, by the server, the estimated record count exceeds the predetermined record count; or further includes cancelling, by the server, the search query based on the estimated record count exceeding the predetermined record count; or any combination thereof.

Alternatively, in the first embodiment, the third computed data source is generated based on the second computed data source; the third computed data source is generated based on a first query for a first ratio value and a second query for a second ratio value for all combinations of the plurality of groupings in the multi-dimensional database, the first ratio value for a first grouping, grouping1, and a second grouping, grouping2, of the plurality of groupings is calculated by: select 'grouping1, 'grouping2' as grouping_name, count (distinct lower(grouping1)), count(distinct lower(grouping2)), count(distinct lower(grouping1), lower(grouping2)), month from table where month in ('month1', 'month2', . . . , 'monthN') group by month, and the second ratio value for the first grouping, grouping1, and the second grouping, grouping2, is calculated by: select 'grouping2, 'grouping1' as grouping_name, count(distinct lower(grouping2)), count (distinct lower(grouping1)), count(distinct lower(grouping2), lower(grouping1)), month from the multi-dimensional database where month in ('month1', 'month2', . . . , 'monthN') group by month; or the second computed data source and the third computed data source are recomputed on a predetermined interval, the second computed data source is recomputed before the third computed data source, and the third computed data source is subsequently recomputed based on the second computed data source.

Alternatively, the first embodiment further includes comparing, by the server, the search query and the previously executed search queries of the first computed data source to determine whether the search query matches one of the previously executed search queries; further includes determining, by the server, a database processing system to execute the search query based on the search parameters of the search query and the estimated record count; the first computed data source is updated after each completed search query; the predetermined categories of the second computed data source comprises a month category; or the multi-dimensional database of records comprises at least 1 trillion records; or any combination thereof.

In a second embodiment, the present disclosure provides a method for processing a plurality of search queries, the method includes receiving, by a server, a search query comprising search parameters to retrieve data from a multi-dimensional database; generating, by the server, a first computed data source, a second computed data source, and a third computed data source The first computed data source comprises historical data associated with previously executed search queries on the multi-dimensional database and actual record counts returned by the previously executed search queries, the second computed data source comprises a total count of distinct values for each of a plurality of groupings segmented by predetermined categories within the multi-dimensional database, and the third computed data source comprises a correlation of the total count of distinct values between at least two of the plurality of groupings The method further includes computing, by the server, an estimated record count for the search query on the multi-dimensional database based on a comparison between the search query and the previously executed search queries of the first computed data source and an estimation equation comprising data values from the second computed data source and the third computed data source; and executing, by the server, the search query based on the estimated record count not exceeding a predetermined record count.

Additionally, in the second embodiment the third computed data source is generated based on the second computed data source; the third computed data source is generated based on a first query for a first ratio value and a second query for a second ratio value for all combinations of the plurality of groupings in the multi-dimensional database, wherein the first ratio value for a first grouping, grouping1, and a second grouping, grouping2, of the plurality of groupings is calculated by: select 'grouping1, 'grouping2' as grouping_name, count(distinct lower(grouping1)), count (distinct lower(grouping2)), count(distinct lower(grouping1), lower(grouping2)), and the second ratio value for the first grouping, grouping1, and the second grouping, grouping2, is calculated by: select 'grouping2, 'grouping1' as grouping_name, count(distinct lower(grouping2)), count (distinct lower(grouping1)), count(distinct lower(grouping2), lower(grouping1)); or the second computed data source and the third computed data source are recomputed on a predetermined interval, wherein the second computed data source is recomputed before the third computed data source, and the third computed data source is subsequently recomputed based on the second computed data source.

Alternatively, the second embodiment further includes comparing, by the server, the search query and the previously executed search queries of the first computed data source to determine whether the search query matches one of the previously executed search queries; further includes determining, by the server, the estimated record count exceeds the predetermined record count; and cancelling, by the server, the search query based on the estimated record count exceeding the predetermined record count; further includes determining, by the server, a database processing system to execute the search query based on the search parameters of the search query and the estimated record count; or further includes updating, by the server, the first computed data source after each completed search query, wherein an update to the first computed data source comprises the search query and an actual record count for the search query; or any combination thereof.

In a third embodiment, the present disclosure provides a method for processing a plurality of search queries, the method includes receiving, by a server, a search query comprising search parameters to retrieve data from a multi-dimensional database; receiving, by the server, a first computed data source, a second computed data source, and a third computed data source. The first computed data source includes historical data associated with previously executed search queries on the multi-dimensional database and actual record counts returned by the previously executed search queries, the second computed data source includes a total count of distinct values for each of a plurality of groupings segmented by predetermined categories within the multi-dimensional database, and the third computed data source includes a correlation of the total count of distinct values between at least two of the plurality of groupings; comparing, by the server, the search query and the previously executed search queries of the first computed data source to determine whether the search query matches one of the previously executed search queries; computing, by the server, an estimated record count for the search query on the multi-dimensional database based on a comparison between the search query and the previously executed search queries of the first computed data source and an estimation equation comprising data values from the second computed data source and the third computed data source; and one of: executing, by the server, the search query based on the estimated record count not exceeding a predetermined record count; or cancelling, by the server, the search query based on the estimated record count exceeding the predetermined record count.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

As used herein, the singular form of "a", "an", and "the" include the plural references unless the context clearly dictates otherwise.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material. None is admitted prior art.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A method for processing a plurality of search queries, the method comprising:
   receiving, by a server, a search query comprising search parameters to retrieve data from a multi-dimensional database;
   receiving, by the server, a first computed data source, a second computed data source, and a third computed data source, wherein:
      the first computed data source comprises historical data associated with previously executed search queries on the multi-dimensional database and actual record counts returned by the previously executed search queries,
      the second computed data source comprises a total count of distinct values for each of a plurality of groupings segmented by predetermined categories within the multi-dimensional database, and
      the third computed data source comprises a correlation of the total count of distinct values between at least two of the plurality of groupings;

computing, by the server, an estimated record count for the search query on the multi-dimensional database based on a comparison between the search query and the previously executed search queries of the first computed data source and an estimation equation comprising data values from the second computed data source and the third computed data source; and executing, by the server, the search query based on the estimated record count not exceeding a predetermined record count.

2. The method of claim 1, further comprising:
comparing, by the server, the search query and the previously executed search queries of the first computed data source to determine whether the search query matches one of the previously executed search queries.

3. The method of claim 1, further comprising:
determining, by the server, the estimated record count exceeds the predetermined record count.

4. The method of claim 3, further comprising:
cancelling, by the server, the search query based on the estimated record count exceeding the predetermined record count.

5. The method of claim 1, further comprising:
determining, by the server, a database processing system to execute the search query based on the search parameters of the search query and the estimated record count.

6. The method of claim 1, wherein the first computed data source is updated after each completed search query.

7. The method of claim 1, wherein the third computed data source is generated based on the second computed data source.

8. The method of claim 7, wherein the third computed data source is generated based on a first query for a first ratio value and a second query for a second ratio value for all combinations of the plurality of groupings in the multi-dimensional database, wherein the first ratio value for a first grouping, grouping1, and a second grouping, grouping2, of the plurality of groupings is calculated by:
select 'grouping1, 'grouping2' as grouping_name, count (distinct lower(grouping1)), count(distinct lower (grouping2)), count(distinct lower(grouping1),lower (grouping2)), month from table where month in ('month1', 'month2', . . . , 'monthN') group by month,
and wherein the second ratio value for the first grouping, grouping1, and the second grouping, grouping2, is calculated by:
select 'grouping2, 'grouping1' as grouping_name, count (distinct lower(grouping2)), count(distinct lower (grouping1)), count(distinct lower(grouping2),lower (grouping1)), month from the multi-dimensional database where month in ('month1', 'month2', . . . , 'monthN') group by month.

9. The method of claim 7, wherein the second computed data source and the third computed data source are recomputed on a predetermined interval, wherein the second computed data source is recomputed before the third computed data source, and the third computed data source is subsequently recomputed based on the second computed data source.

10. The method of claim 1, wherein the predetermined categories of the second computed data source comprises a month category.

11. The method of claim 1, wherein the multi-dimensional database of records comprises at least 1 trillion records.

12. A method for processing a plurality of search queries, the method comprising:

receiving, by a server, a search query comprising search parameters to retrieve data from a multi-dimensional database;

generating, by the server, a first computed data source, a second computed data source, and a third computed data source, wherein:
the first computed data source comprises historical data associated with previously executed search queries on the multi-dimensional database and actual record counts returned by the previously executed search queries,
the second computed data source comprises a total count of distinct values for each of a plurality of groupings segmented by predetermined categories within the multi-dimensional database, and
the third computed data source comprises a correlation of the total count of distinct values between at least two of the plurality of groupings;

computing, by the server, an estimated record count for the search query on the multi-dimensional database based on a comparison between the search query and the previously executed search queries of the first computed data source and an estimation equation comprising data values from the second computed data source and the third computed data source; and executing, by the server, the search query based on the estimated record count not exceeding a predetermined record count.

13. The method of claim 12, further comprising:
comparing, by the server, the search query and the previously executed search queries of the first computed data source to determine whether the search query matches one of the previously executed search queries.

14. The method of claim 12, further comprising:
determining, by the server, the estimated record count exceeds the predetermined record count; and
cancelling, by the server, the search query based on the estimated record count exceeding the predetermined record count.

15. The method of claim 12, further comprising:
determining, by the server, a database processing system to execute the search query based on the search parameters of the search query and the estimated record count.

16. The method of claim 12, further comprising:
updating, by the server, the first computed data source after each completed search query, wherein an update to the first computed data source comprises the search query and an actual record count for the search query.

17. The method of claim 12, wherein the third computed data source is generated based on the second computed data source.

18. The method of claim 17, wherein the third computed data source is generated based on a first query for a first ratio value and a second query for a second ratio value for all combinations of the plurality of groupings in the multi-dimensional database, wherein the first ratio value for a first grouping, grouping1, and a second grouping, grouping2, of the plurality of groupings is calculated by:
select 'grouping1, 'grouping2' as grouping_name, count (distinct lower(grouping1)), count(distinct lower (grouping2)), count(distinct lower(grouping1), lower (grouping2)), and wherein the second ratio value for the first grouping, grouping1, and the second grouping, grouping2, is calculated by:
select 'grouping2, 'grouping1' as grouping_name, count (distinct lower(grouping2)), count(distinct lower(grouping1)),count(distinct lower (grouping2),lower(grouping1)).

19. The method of claim 17, wherein the second computed data source and the third computed data source are recomputed on a predetermined interval, wherein the second computed data source is recomputed before the third computed data source, and the third computed data source is subsequently recomputed based on the second computed data source.

20. A method for processing a plurality of search queries, the method comprising:
   receiving, by a server, a search query comprising search parameters to retrieve data from a multi-dimensional database;
   receiving, by the server, a first computed data source, a second computed data source, and a third computed data source, wherein:
      the first computed data source comprises historical data associated with previously executed search queries on the multi-dimensional database and actual record counts returned by the previously executed search queries,
      the second computed data source comprises a total count of distinct values for each of a plurality of groupings segmented by predetermined categories within the multi-dimensional database, and
      the third computed data source comprises a correlation of the total count of distinct values between at least two of the plurality of groupings;
   comparing, by the server, the search query and the previously executed search queries of the first computed data source to determine whether the search query matches one of the previously executed search queries;
   computing, by the server, an estimated record count for the search query on the multi-dimensional database based on a comparison between the search query and the previously executed search queries of the first computed data source and an estimation equation comprising data values from the second computed data source and the third computed data source; and
   one of:
      executing, by the server, the search query based on the estimated record count not exceeding a predetermined record count; or
   cancelling, by the server, the search query based on the estimated record count exceeding the predetermined record count.

* * * * *